Aug. 5, 1958     H. N. HAVILAND     2,845,830
DOUBLE DRUM BEATING APPARATUS
Filed Feb. 7, 1955     2 Sheets-Sheet 1

INVENTOR.
Horace N. Haviland
BY
Frank E. Liverance Jr.
Attorney

Aug. 5, 1958  H. N. HAVILAND  2,845,830
DOUBLE DRUM BEATING APPARATUS
Filed Feb. 7, 1955  2 Sheets-Sheet 2
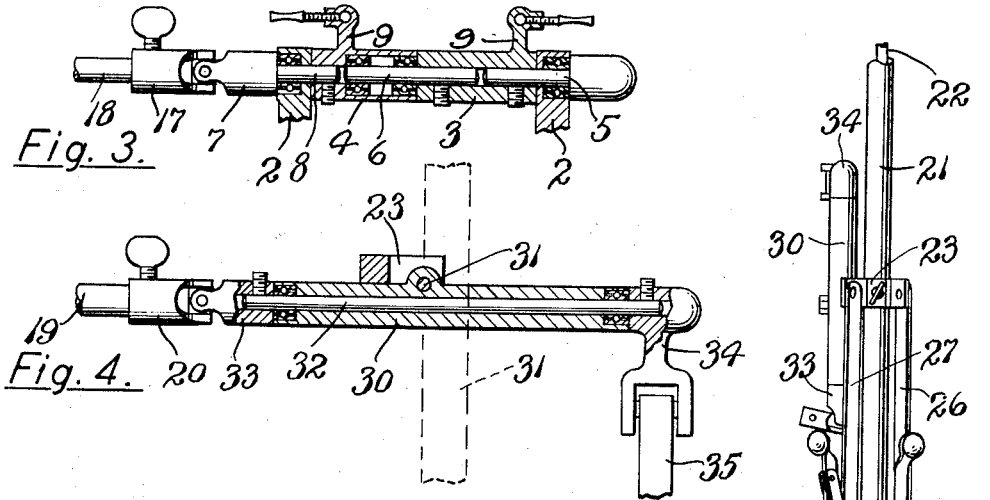
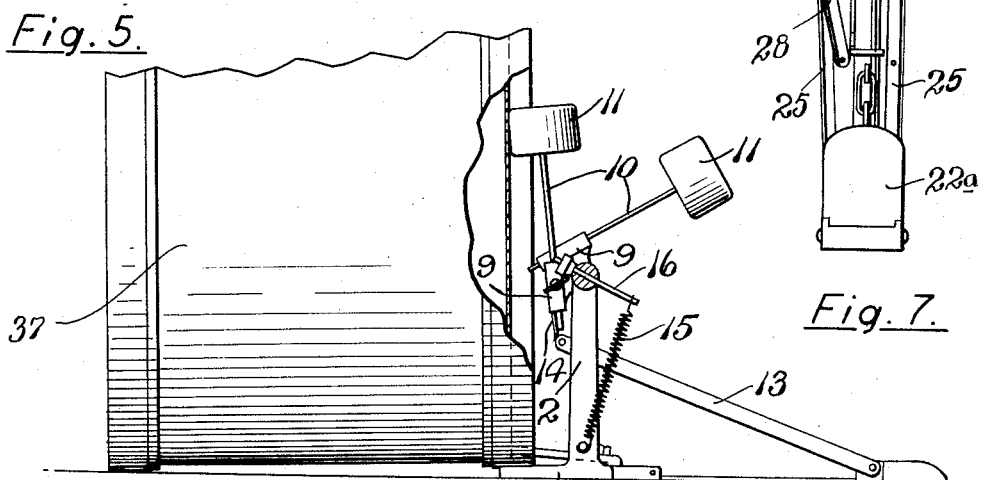
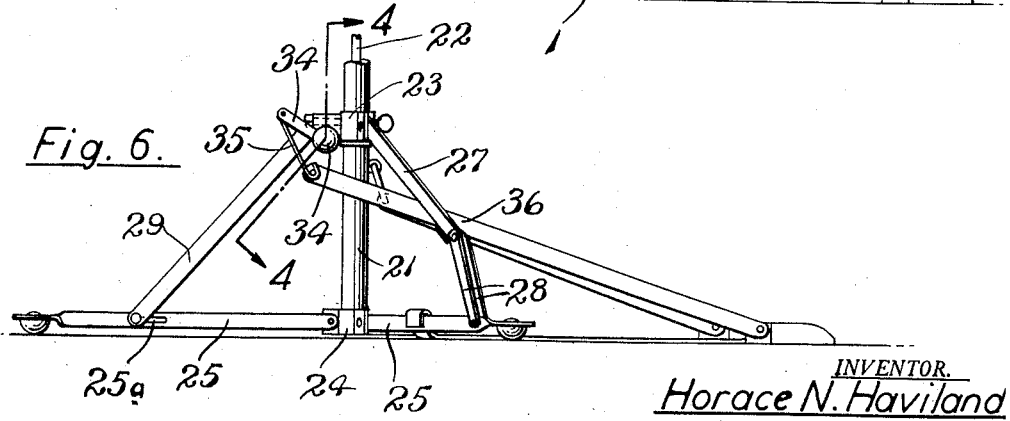
INVENTOR.
Horace N. Haviland
-BY-
Frank E. Liverance, Jr.
Attorney

| United States Patent Office | 2,845,830
Patented Aug. 5, 1958 |

2,845,830

DOUBLE DRUM BEATING APPARATUS

Horace N. Haviland, Holland, Mich.

Application February 7, 1955, Serial No. 486,351

4 Claims. (Cl. 84—422)

This invention relates to a novel and practical double drum beating apparatus. It is a primary object and purpose of the present invention to provide a novel apparatus for doubling the beating of a drum, the operation thereof being by the feet of the drummer. Normally in a band or the like, the beating of the drum is by a single beater, foot operated, the other foot of the operator being used for cymbal operation. With my invention both feet of the operator may be used, one for operating the single drum beater as before, and the other to operate a second drum beater alternately with or between the beats of the first drum beater.

It is a further object and purpose of the invention to provide a structure which can be associated with the cymbals and the stand and rod which carries them which may be located at different adjusted distances from the immediate drum beating apparatus, can be disassembled for placing in a carrying case in relatively small space when not in use, and which produces a very effective double drum beating apparatus. Attempts have been made previously to accomplish such drum beating but have been unsatisfactory. With my invention an improved and effective apparatus for the purposes stated is provided.

An understanding of the invention may be had from the following description, taken in connection with the accompanying drawings, in which, Fig. 1 is an elevation of the drum beating apparatus embodying my invention.

Fig. 3 is an enlarged longitudinal vertical section through the upper portion of the immediate double beating apparatus taken in the plane of line 3—3 of Fig. 2 and looking in the direction of the arrows.

Fig. 4 is a similar enlarged section through the upper portion of the attachment to the cymbal stand for mounting and connecting the foot pedal which operates the second drum beater, the plane of the section being that shown at the line 4—4 in Fig. 6.

Fig. 5 is a transverse vertical section substantially on the plane of line 5—5 of Fig. 2 looking in the direction indicated.

Fig. 6 is an end elevation as viewed from the plane of line 6—6 of Fig. 1, and

Fig. 7 illustrates the cymbal stand folded when not in use.

Like reference characters refer to like parts in the different figures of the drawings.

Figure 1:
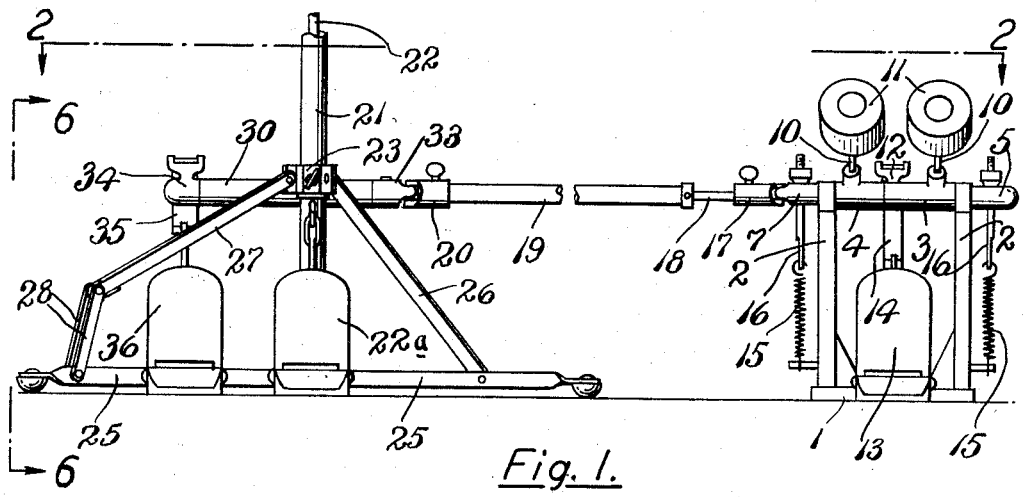
Figure 2:
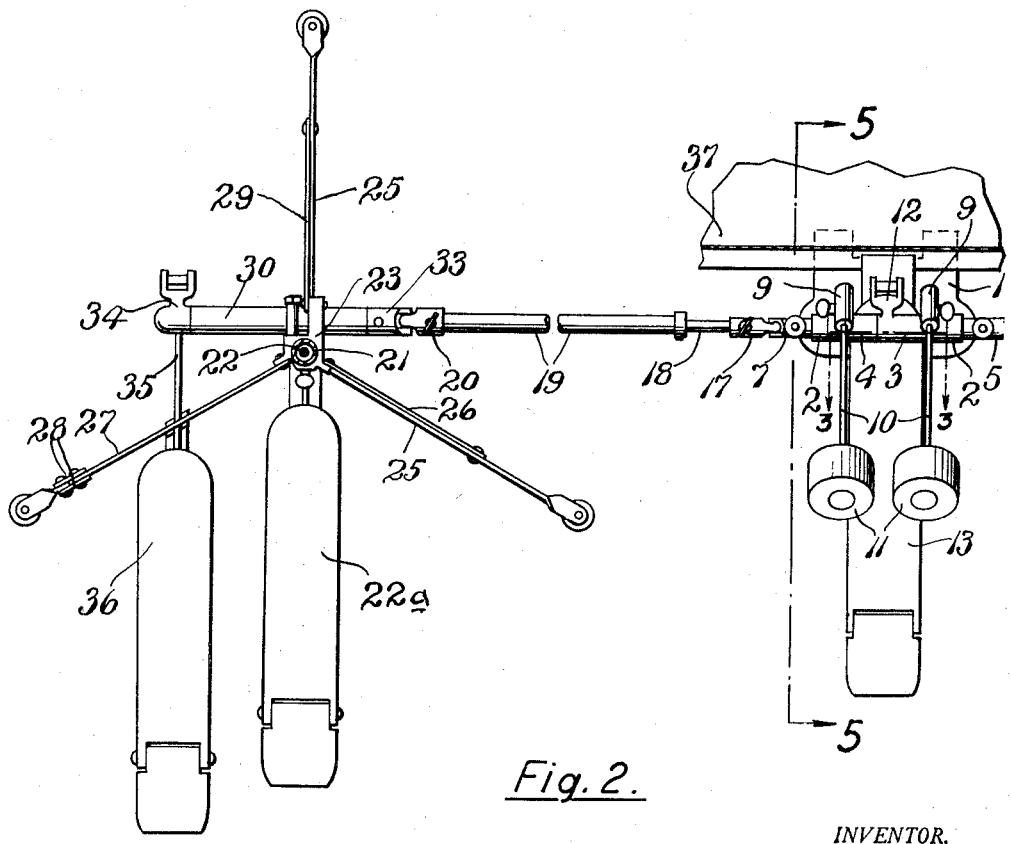
Fig. 2 is a plan and partial sectional view on the plane of line 2—2 of Fig. 1 looking downwardly.

In the structure shown in Figs. 1 and 2, a support having a flat bottom plate 1 to rest upon the floor and two spaced parallel vertical uprights 2 has two horizontal sleeves 3 and 4 disposed in alignment between the upper ends of said posts (Fig. 3). A pin 5 having a knob at its outer end passes through the upper end of one post 2 and is rotatable therein, extending partially into the adjacent end of the sleeve 3 and secured thereto by a set screw. A second pin 6 aligned with the pin 5 bridges the juncture of the two sleeves 3 and 4, extending partially into an end of each. It is connected with the sleeve 3 by a set screw, sleeve 4 being freely rotatable thereon. A member 7 forming one part of a universal joint has a pin rotatably passing through the other post 2 into the adjacent end of the sleeve 4, being fixed thereto by a set screw.

From each of the sleeves 3 and 4 an arm 9 terminating in a sleeve extends. Through each of such sleeves a rod 10 passes and is secured by thumb screws (Fig. 2). At its outer end each rod 10 has a beater head 11. From a second arm 12 connected to the sleeve 3 a link 14 makes connection with a foot pedal 13 (Fig. 7). With each of the members 5 and 7 a coiled tension spring 15 is associated at its lower end connected with the post 2 and at its upper end with a rod 16 passing, one through each of the parts 5 and 7, and adjustable thereon to control the tension of the spring. Such springs as shown in Fig. 5, normally hold the beater heads 11 in outer position.

A second universal joint member 17 is connected with the first described universal joint member 7. A rod 18 is telescopically received at one end in the member 17 and detachably secured by a thumb screw. Rod 18 telescopes into a tube 19 and at any desired adjusted position with respect to the tube 19 may be releasably secured in place by a thumb or set screw. At the outer end of the tube 19 a universal joint member 20, similar to the member 17, is detachably secured by use of a thumb screw.

With my invention the cymbal stand post may be utilized. Such post 21 is of a tubular form, a rod 22 passing upwardly therethrough. In the usual manner which is well known, the post 21 carries one cymbal fixed at its upper end while the rod 2 has a second cymbal which is moved downwardly against the first cymbal by foot pedal operation in accordance with well known structure. Such foot pedal is shown at 22a in Figs. 1 and 2.

A collar member 23 is slidably mounted on the post and can be fixed at an upper position, as in Fig. 6, by a thumb screw. At the lower end of the post 21 is a fixed collar 24 with outwardly extending spaced radial ears to which the inner ends of bars 25 three in number are pivotally connected and between one of which and like ears extending outwardly from the collar 23, a brace 26 is interposed pivotally connected at opposite ends to the bar 25 and said ears on collar 23. An additional bar 27 is likewise pivotally connected at its inner end to one of the ears on the collar 23 and at its lower end has two links 28 (Fig. 6) pivotally connected thereto, the opposite ends of said links 28 connecting to one of the other bars 25. The third bar 25 connected to an ear of the lower collar 24 extends to the rear. It has a slot 25a therein (Fig. 6). A bracing link 29 has a pin or rivet at its lower end passing through said slot and at its upper end extends to a rearwardly extending lug on the collar 23 (Fig. 2) to which it is pivotally connected.

An elongated sleeve 30 is mounted between its ends on collar 23 to turn about a pin 31 extending transversely therethrough and connected with the collar 23 (Fig. 2). The sleeve 30, when free to do so may be swung into vertical position shown in dashed lines in Fig. 4 but normally when turned down to horizontal position is stopped at such position by the rearwardly extending lug of collar 23.

The sleeve 33 has a shaft 32 therethrough extending outwardly beyond both ends of the sleeve. One end of the rod 32 is telescopically received in a universal joint member 33 connected with the joint member 20, being releasably secured by a set screw as shown in Fig. 4. At the opposite projecting end of the rod 32 is a releasably connected arm 34 extending to the rear (Fig. 6) which through a detachable link 35 is connected with a foot pedal 36 locked alongside of and parallel to the cymbal operating foot pedal (Figs. 1 and 2) which is hook connected to a lower bar 25. Pedal 36 is below brace 27 and links 28.

Downward operation of the pedal 36 rotates the shaft 32 and through the universal joint connections at 33 and 20 rotates tube 19, rod 18, the universal joint members 17 and 7, rod 8 and the sleeve 4. It is therefore apparent that the two beaters consisting of the rods 10 and heads 11 are independently operable and are each foot operated. A drum as at 37 in Fig. 5, releasably clamped to the base 1, has its drum surface vertically positioned for striking thereagainst of the heads 11 as they are operated from their normal outer positions to vertical positions.

The cymbal stand including the vertical tubular support 21 and its folding base, when disconnected by releasing the set screw associated with the universal joint member 20 to release the tube 19 and further removing foot pedal 36, is foldable as in Fig. 7 to occupy little space. The pin and slot connection at 25a of the brace 29 to one of the lower bars 25 of the cymbal stand provides such folding. The brace structure including the bar 27 and links 28 permits a location thereof as in Fig. 6 so that the pedal 36 is not interfered with in its operation as it would be if a brace like that at 26 or 29 was used. The rod 18 when disassembly takes place is disconnected from the universal joint member 17. Thus, the parts are readily disassembled for placing in a case when not in use.

Because of the universal joints at the ends of rods 18 and tube 19 and because of the telescopic connection of such rod and tube, the cymbal stand may be located at a large number of different distances relative to the immediate drum beating apparatus, and at different angles than the straight angle shown in Figs. 1 and 2.

The structure described has been built and on extensive use has proved particularly effective and serviceable. It is to be understood that it is not necessary that a cymbal stand be used as the apparatus is useful whether or not the vertical tube forming a part of the cymbal apparatus is used, as such tube may be supplanted by any vertical support to serve its support functions whether or not cymbals and operative means for working the cymbals are associated therewith.

The invention is defined in the appended claims and is to be considered comprehensive of all forms of structure coming within their scope.

I claim:

1. A support, two aligned sleeves independently rotatably mounted on said support, a drum beater on each sleeve movable with rotation of said sleeves from inoperative to drum beating operative position, a foot pedal and connections between it and one sleeve for moving one of the beaters to drum beating position, a vertical support, a sleeve adapted to be horizontally supported thereon, a shaft passing through said last mentioned sleeve, a universal joint detachably connected with one end of said shaft, a second universal joint connected with the other of said first mentioned sleeves, an elongated member between and connecting said universal joints, and a second foot pedal and connections between it and the opposite end of said shaft for turning the shaft in its sleeve mounting to move the second of said beaters from inoperative to drum beating position.

2. A support, two aligned sleeves independently rotatably mounted on said support, a drum beater on each sleeve movable upon rotative movements thereof from inoperative to drum beating operative positions, foot operative means operatively engaged with one of said sleeves for rotating said one sleeve in one direction, means engaged with said sleeves for yieldingly holding said sleeve in inoperative positions, a vertical support at a distance from the first support, a second foot operative rotatable means carried by said vertical support, and an elongated member connected to said last mentioned foot operated means and the second of said sleeves for rotating said last mentioned sleeve to drum beating position on operation of said second foot operated means, said elongated member comprising a tube, a rod telescoping into said tube at one end, and means engaging said rod and tube for releasably securing said tube and rod in any position to which adjusted with respect to each other.

3. In drum beating apparatus having a support, two independently movable beaters thereon and means for foot operating one of said beaters, a vertical support at a distance from the first support, foot operated means at the lower end of said vertical support, a horizontal shaft carried by said vertical support, connecting means connecting said last foot operated means to said shaft for rotating said shaft, and rigid horizontal means extending from said shaft to the other of said beaters and connecting them for moving said other beater on foot operation of said second mentioned foot operated means, said rigid horizontal connecting means comprising, two connected longitudinal adjustable members for increasing or decreasing the length thereof, universal joint connections between the first shaft and said adjustable shaft, and universal joint connections between said adjustable shaft and the other of said beaters.

4. Drum beating apparatus including vertically disposed support means having independently and axially rotatable sleeve members mounted thereon, a drum beater mounted upon each of said sleeve members and separately movable therewith from an inoperative to a drum beating position upon axial rotation of said sleeve members, foot operated means connected to said sleeve members for axially rotating said sleeve members and actuating said drum beaters, one of said foot operated means being disposed a substantial distance apart from said vertical support and including a second vertical support and a universally jointed operative inter-connection with one of said sleeve members for rotation thereof and actuation of the drum beater mounted thereon.

References Cited in the file of this patent

UNITED STATES PATENTS

| 2,445,486 | La Londe | July 20, 1948 |
| 2,581,515 | Christian | Jan. 8, 1952 |

FOREIGN PATENTS

| 472,643 | Germany | Mar. 2, 1929 |